(12) United States Patent
Fung

(10) Patent No.: US 10,722,749 B2
(45) Date of Patent: Jul. 28, 2020

(54) SYSTEM AND METHOD USING TWO-STAGE NEURAL NETWORKS FOR PREDICTIVE HEALTH MONITORING

(71) Applicant: Blue Goji LLC, Austin, TX (US)

(72) Inventor: Coleman Fung, Spicewood, TX (US)

(73) Assignee: BLUE GOJI LLC, Austin, TX (US)

( * ) Notice: Subject to any disclaimer, the term of this patent is extended or adjusted under 35 U.S.C. 154(b) by 0 days.

(21) Appl. No.: 16/527,434

(22) Filed: Jul. 31, 2019

(65) Prior Publication Data

US 2019/0344120 A1 Nov. 14, 2019

Related U.S. Application Data

(63) Continuation of application No. 16/509,465, filed on Jul. 11, 2019, which is a continuation-in-part of (Continued)

(51) Int. Cl.

| | |
|---|---|
| G06F 1/16 | (2006.01) |
| A63B 24/00 | (2006.01) |
| G06T 19/00 | (2011.01) |
| A63B 23/04 | (2006.01) |
| A63B 22/00 | (2006.01) |
| A63B 22/02 | (2006.01) |
| A63F 13/65 | (2014.01) |
| G06F 3/01 | (2006.01) |
| A63F 13/40 | (2014.01) |
| A63B 22/06 | (2006.01) |

(Continued)

(52) U.S. Cl.
CPC ...... *A63B 24/0003* (2013.01); *A63B 22/0046* (2013.01); *A63B 22/0285* (2013.01); *A63B 22/0292* (2015.10); *A63B 22/06* (2013.01); *A63B 23/04* (2013.01); *A63F 13/212* (2014.09); *A63F 13/214* (2014.09); *A63F 13/40* (2014.09); *A63F 13/65* (2014.09); *G06F 1/163* (2013.01); *G06F 3/011* (2013.01); *G06F 3/016* (2013.01); *G06T 19/006* (2013.01); *H04W 84/18* (2013.01)

(58) Field of Classification Search
None
See application file for complete search history.

(56) References Cited

U.S. PATENT DOCUMENTS 6,805,668 B1 * 10/2004 Cadwell .............. A61B 5/16
600/300
2014/0316220 A1 10/2014 Sheldon
(Continued)

OTHER PUBLICATIONS

Ghavami et al., Artificial Neural Network-enabled Prognostics for Patient Health Management, 2012, IEEE, 8 total pages (Year: 2012).*

*Primary Examiner* — Alan Chen
(74) *Attorney, Agent, or Firm* — Brian R. Galvin; Brian S. Boon; Galvin Patent Law LLC

(57) ABSTRACT

A system and method for predictive health monitoring using neural networks, comprising a wearable device with biometric sensors, a database containing data from multiple users across many categories of health-related factors, a first set of neural networks trained on the database that makes health predictions based on a single health factor, and a second neural network that makes health predictions based on a combination of the predictions made by the first set of neural networks.

14 Claims, 13 Drawing Sheets

Related U.S. Application Data application No. 15/992,108, filed on May 29, 2018, now abandoned, and a continuation-in-part of application No. 15/853,746, filed on Dec. 23, 2017, now Pat. No. 10,265,578, which is a continuation of application No. 15/219,115, filed on Jul. 25, 2016, now Pat. No. 9,849,333, and a continuation-in-part of application No. 15/193,112, filed on Jun. 27, 2016, now abandoned, and a continuation-in-part of application No. 15/187,787, filed on Jun. 21, 2016, now Pat. No. 10,124,255, which is a continuation-in-part of application No. 15/175,043, filed on Jun. 7, 2016, now Pat. No. 9,766,696, application No. 16/527,434, which is a continuation of application No. 16/509,465, filed on Jul. 11, 2019, which is a continuation-in-part of application No. 15/992,108, filed on May 29, 2018, now abandoned, which is a continuation-in-part of application No. 15/853,746, filed on Dec. 23, 2017, now Pat. No. 10,265,578, which is a continuation of application No. 15/219,115, filed on Jul. 25, 2016, now Pat. No. 9,849,333, which is a continuation-in-part of application No. 15/193,112, filed on Jun. 27, 2016, now abandoned, which is a continuation-in-part of application No. 15/187,787, filed on Jun. 21, 2016, now Pat. No. 10,124,255, which is a continuation-in-part of application No. 14/846,966, filed on Sep. 7, 2015, now Pat. No. 10,080,958, and a continuation-in-part of application No. 14/012,879, filed on Aug. 28, 2013.

(60) Provisional application No. 62/661,220, filed on Apr. 23, 2018, provisional application No. 62/330,602, filed on May 2, 2016, provisional application No. 62/330,642, filed on May 2, 2016, provisional application No. 62/310,568, filed on Mar. 18, 2016, provisional application No. 61/696,068, filed on Aug. 31, 2012.

(51) Int. Cl.
*A63F 13/214* (2014.01)
*A63F 13/212* (2014.01)
*H04W 84/18* (2009.01)

(56) References Cited

U.S. PATENT DOCUMENTS

| | | |
|---|---|---|
| 2018/0150609 A1 | 5/2018 | Kim et al. |
| 2019/0034589 A1 | 1/2019 | Chen et al. |
| 2019/0080055 A1* | 3/2019 | Bettencourt Da Silva ............... G06F 19/34 |
| 2019/0183431 A1* | 6/2019 | Attia ................. G06N 3/084 |
| 2019/0209022 A1* | 7/2019 | Sobol ................. A61B 5/0002 |
| 2019/0324444 A1* | 10/2019 | Cella ................. G05B 19/4184 |
| 2019/0340760 A1* | 11/2019 | Swank ................. G06T 7/0014 |
| 2019/0384790 A1* | 12/2019 | Bequet ............. G06F 16/90344 |

* cited by examiner

SYSTEM AND METHOD USING TWO-STAGE NEURAL NETWORKS FOR PREDICTIVE HEALTH MONITORING

CROSS-REFERENCE TO RELATED APPLICATIONS

| Application No. | Date Filed | Title |
|---|---|---|
| Current application | Herewith | SYSTEM AND METHOD FOR PREDICTIVE HEALTH MONITORING |
| | | Is a continuation of: |
| 16/509,465 | Jul. 11, 2019 | SYSTEM AND METHOD FOR PREDICTIVE HEALTH MONITORING |
| | | which is a continuation-in-part of: |
| 15/992,108 | May 29, 2018 | SYSTEM AND METHODS FOR A SMART WEIGHT TRAINING BELT |
| | | which claims priority to, and benefit of: |
| 62/661,220 | Apr. 23, 2018 | SYSTEM AND METHODS FOR A SMART WEIGHT TRAINING BELT |
| | | and is also a continuation-in-part of: |
| 15/853,746 Patent 10,265,578 | Dec. 23, 2017 Issue Date Apr. 23, 2019 | VARIABLE-RESISTANCE EXERCISE MACHINE WITH WIRELESS COMMUNICATION FOR SMART DEVICE CONTROL AND INTERACTIVE SOFTWARE APPLICATIONS |
| | | which is a continuation of: |
| 15/219,115 Patent 9,849,333 | Jul. 25, 2016 Issue Date Dec. 26, 2017 | VARIABLE-RESISTANCE EXERCISE MACHINE WITH WIRELESS COMMUNICATION FOR SMART DEVICE CONTROL AND VIRTUAL REALITY APPLICATIONS |
| | | which claims priority to, and benefit of: |
| 62/330,642 | May 2, 2016 | VARIABLE-RESISTANCE EXERCISE MACHINE WITH WIRELESS COMMUNICATION FOR SMART DEVICE CONTROL AND VIRTUAL REALITY APPLICATIONS |
| | | and is also a continuation-in-part of: |
| 15/193,112 | Jun. 27, 2016 | NATURAL BODY INTERACTION FOR MIXED OR VIRTUAL REALITY APPLICATIONS |
| | | which claims priority to, and benefit of: |
| 62/330,602 | May 2, 2016 | NATURAL BODY INTERACTION FOR MIXED OR VIRTUAL REALITY APPLICATIONS |
| | | and is also a continuation-in-part of: |
| 15/187,787 Patent 10,124,255 | Jun. 21, 2016 Issue Date Nov. 13, 2018 | MULTIPLE ELECTRONIC CONTROL AND TRACKING DEVICES FOR MIXED-REALITY INTERACTION |
| | | and is also a continuation-in-part of |
| 15/175,043 Patent 9,766,696 | Jun. 7, 2016 Issue Date Sept 19, 2017 | APPARATUS FOR NATURAL TORSO TRACKING AND FEEDBACK FOR ELECTRONIC INTERACTION |
| | | which claims priority to, and benefit of: |
| 62/310,568 | Mar. 18 2016 | APPARATUS FOR NATURAL TORSO TRACKING AND FEEDBACK FOR ELECTRONIC INTERACTION |
| Current application | Herewith | SYSTEM AND METHOD FOR PREDICTIVE HEALTH MONITORING |
| | | Is a continuation of: |
| 16/509,465 | Jul. 11, 2019 | SYSTEM AND METHOD FOR PREDICTIVE HEALTH MONITORING |
| | | is a continuation-in-part of: |
| 15/992,108 | May 29, 2018 | SYSTEM AND METHODS FOR A SMART WEIGHT TRAINING BELT |
| | | which is a continuation-in-part of: |
| 15/853,746 Patent 10,265,578 | Dec. 23, 2017 Issue Date Apr. 23, 2019 | VARIABLE-RESISTANCE EXERCISE MACHINE WITH WIRELESS COMMUNICATION FOR SMART DEVICE CONTROL AND INTERACTIVE SOFTWARE APPLICATIONS |
| | | which is a continuation of: |
| 15/219,115 Patent 9,849,333 | Jul. 25, 2016 Issue Date Dec. 26, 2017 | VARIABLE-RESISTANCE EXERCISE MACHINE WITH WIRELESS COMMUNICATION FOR SMART DEVICE CONTROL AND VIRTUAL REALITY APPLICATIONS |

-continued

| Application No. | Date Filed | Title |
|---|---|---|
| 15/193,112 | Jun. 27, 2016 | which is a continuation-in-part of: NATURAL BODY INTERACTION FOR MIXED OR VIRTUAL REALITY APPLICATIONS |
| 15/187,787 Patent 10,124,255 | Jun. 21, 2016 Issue Date Nov. 13, 2018 | which is a continuation-in-part of: MULTIPLE ELECTRONIC CONTROL AND TRACKING DEVICES FOR MIXED-REALITY INTERACTION |
| 14/846,966 Patent 10,080,958 | Sept 7, 2015 Issue Date Sept 25, 2018 | which is a continuation-in-part of: MULTIPLE ELECTRONIC CONTROL DEVICES |
| 14/012,879 | Aug. 28, 2013 | and is also a continuation-in-part of: Mobile and Adaptable Fitness System |
| 61/696,068 | Aug. 31, 2012 | which claims priority to, and benefit of: Mobile and Adaptable Fitness System | the entire specification of each of which is incorporated herein by reference.

BACKGROUND OF THE INVENTION

Field of the Art

The disclosure relates to the field of health monitoring devices, specifically the field of wearable health monitoring devices connected to cloud-based predictive networks.

Discussion of the State of the Art

It is currently possible for an athlete of any skill or dedication to go into a gym and find many types of exercise machinery, some of which may have computer chips and various levels of software on them, and some of which may be entirely mechanical in nature. Software-ready electronics are common in stationary bikes, elliptical machines, and treadmills, and in some cases exist for more specialized uses such as measuring the force exerted by a punch for boxing and other martial arts. These electronics and the software systems running on them can measure things such as estimated burned calories in a workout, the force and speed of punches or of running, the Revolutions Per Minute (RPM) of a bike and what this means for distance based on a user's settings on a stationary bike, and in some cases treadmills, elliptical machines and stationary bikes may even allow music or TV to be streamed to the user to enhance the pleasure of working out.

However, electronics with specialized software are noticeably lacking in the area of weight training, of virtually all kinds. There exists no common system which may determine the stresses an individual is undergoing while lifting in a variety of positions and warn them of, for example, poor form, uneven stresses in muscles such as if they are bench pressing, out of bounds positions such as overextending your arms during lateral pulldowns and other exercises, and more.

As well, none of the systems even in exercise machines currently, utilize machine learning and a large number of factors and biometric data to determine and accurately predict health events relevant to a user's exercise before they occur, nor do they often consider or warn a user of improper form during exercise, or for over-training or over-exertion, or myriad other concerns when engaging in strenuous physical activity. This results in users often achieving sub-par results from athletic activity, and being at-risk for health events from improper or overly taxing exercise, with workout equipment ill-equipped to aid or even consider these possibilities or users who have already suffered health events at all.

What is needed is a system and methods for a predictive health monitoring system utilizing a smart exercise belt which may aid in exercises for users to monitor their health and exercise form and progression, and more, and communicate with users to warn them of any health-related or exercise-related issues, with the goal of preventing future incidents if possible, warning users of impending or possible incidents in the near future, and aiding users in exercising both effectively and safely.

SUMMARY OF THE INVENTION

Accordingly, the inventor has conceived and reduced to practice, a system and method for predictive health monitoring using neural networks, comprising a wearable device with biometric sensors, a database containing data from multiple users across many categories of health-related factors, a first set of neural networks trained on the database that makes health predictions based on a single health factor, and a second neural network that makes health predictions based on a combination of the predictions made by the first set of neural networks. The following non-limiting summary of the invention is provided for clarity, and should be construed consistently with embodiments described in the detailed description below.

The disclosed invention makes use of at least a plurality of sensors attached to a wearable device, including pressure sensors, oximeters, accelerometers, gyroscopes, EEG, EMG, and heart rate monitors, to learn patterns of user activity, predict health events, and assist with athletic training including assisting with preventing over-training and assisting with exercise form, as well as tracking performance over time, and to help with medical rehabilitation by measuring performance and biometric feedback during activities after a medical event, for example during physical therapy after a stroke.

A system for predictive health monitoring is disclosed, comprising: a cloud-based health prediction engine comprising: a plurality of first-stage neural networks, each configured to make a first health prediction based on a health-related factor; a second-stage neural network, configured to make a second health prediction based on a combination of the first health predictions from at least two of the plurality of first-stage neural networks; a data storage device configured to store a history of biometric data and a history of health predictions for a user of a wearable biometric monitoring and feedback device; a network-connected server comprising a memory, a processor, and a plurality of programming instructions, wherein the programming instructions, when operating on the processor, cause the network-connected server to: receive biometric data from a wearable biometric monitoring and feedback device for the user; retrieve the history of biometric data and the history of health predictions for the user from the data storage device; process the biometric data, history of biometric data, and the history of health predictions through at least two of the plurality of first-stage neural networks; receive the first health prediction from each first-stage neural network through which the biometric data was processed; process the first health predictions received through a second-stage neural network; receive the second health prediction from the second-stage neural network; send the second health prediction to the wearable biometric monitoring and feedback device, and a wearable biometric monitoring and feedback device comprising: a plurality of sensors for gathering biometric data from the user of the wearable biometric monitoring and feedback device; a network device configured to connect to the cloud-based health prediction system; a screen for providing feedback to the user; and a computing device comprising a memory, a processor, and a plurality of programming instructions, wherein the programming instructions, when operating on the processor, cause the computing device to: obtain biometric data from at least two of the plurality of sensors for the user of the wearable biometric monitoring and feedback device; send the biometric data obtained to the cloud-based health prediction engine using the network device; receive a second health prediction from a cloud-based health prediction engine; and display the second health prediction to the user.

Further, a method for predictive health monitoring is disclosed, comprising the steps of: obtaining biometric data for a user of a wearable biometric monitoring and feedback device; retrieving a history of biometric data and a history of health predictions for the user from a data storage device; processing the biometric data, history of biometric data, and the history of health predictions through at least two of a plurality of first-stage neural networks, the plurality of first-stage neural networks, each configured to make a first health prediction based on a separate health-related factor; receiving a first health prediction from each first-stage neural network through which the biometric data was processed; processing the first health predictions received through a second-stage neural network, the second-stage neural network configured to make a second health prediction based on a combination of the first health predictions from at least two of the plurality of first-stage neural networks; receiving the second health prediction from the second-stage neural network; and displaying the second health prediction to the user of the wearable biometric monitoring and feedback device.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
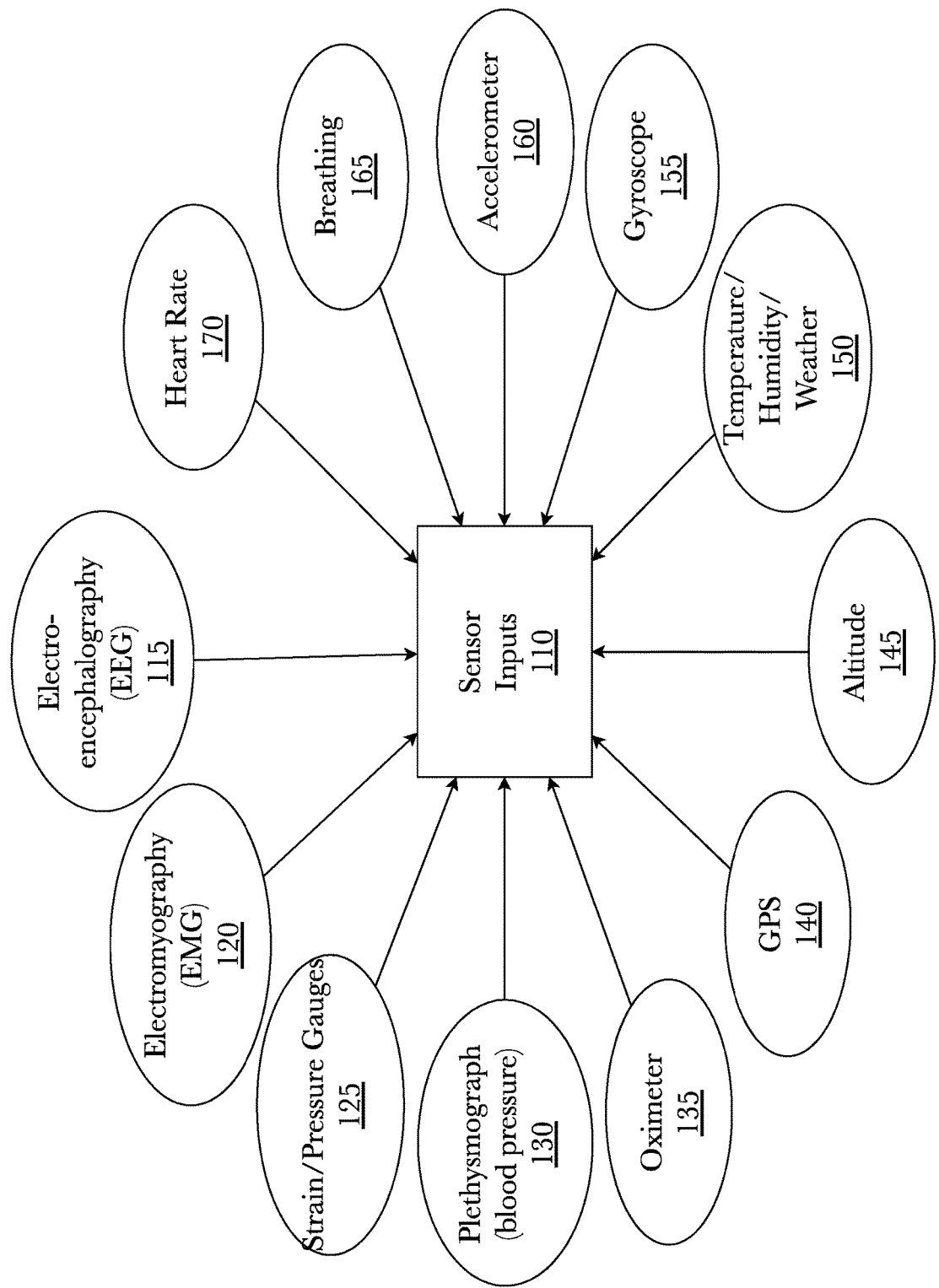
FIG. 1 is an exemplary diagram illustrating a plurality of sensors and sensory data being collected as input.

The inventor has conceived, and reduced to practice, a system and methods for predictive health monitoring.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

FIG. 1 is an exemplary diagram illustrating a plurality of sensors and sensory data that may be collected as input. Sensor inputs 110 may comprise electro-encephalography (EEG) sensors 115, electromyography (EMG) sensors 120, strain or pressure gauges 125, plethysmographs for detecting blood pressure 130, oximeters 135, GPS sensors 140, altitude sensors 145, temperature, humidity, and other relevant climate or weather sensors or networked devices that may obtain such information from the Internet 150, gyroscopes 155, accelerometers 160, breathing sensors 165, and heart rate monitors 170. The sensor inputs 110 may be gathered from sensors placed on or attached to a wearable device, as shown in other drawings, which may be attached to a user during exercise or other physical activity for the purposes of both building a model of user data such as health data and exercise habits, and for predictive health monitoring as a result of this model.

Figure 2:
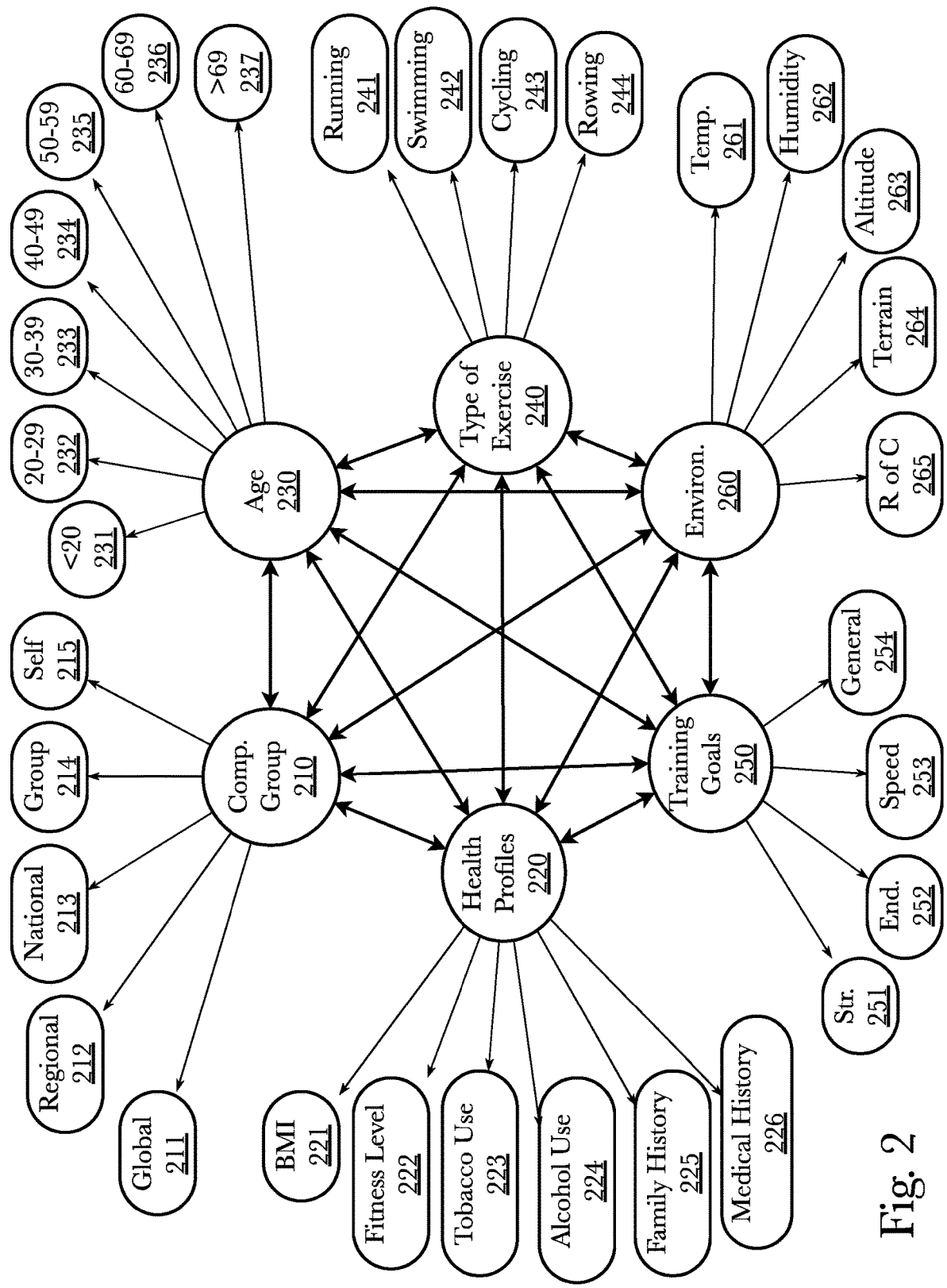
FIG. 2 is an exemplary diagram of various forms of gathered and monitored user data that may be monitored for changes both in an individual user and in user groups, and which may be correlated together using machine learning to find relationships between data values and changes in data values.

FIG. 2 is an exemplary diagram of various forms of gathered and monitored user data that may be monitored for changes both in an individual user and in user groups, and which may be correlated together using machine learning to find relationships between data values and changes in data values. Multiple groups of data may influence each other and be collected in relation to one another, for instance the health profile 220 of a user and the type of exercise they are performing or continually perform 240 may be analyzed together to determine if someone is performing exercises that are more likely to lead to certain injuries, in a predictive health monitoring system. Categories of monitored and acquired data includes data on comparison group size 210, for instance analyzing statistics of other groups according to groups of varying granularity such as national 213 or individual 215 data, health profiles of users 220, user ages 230, type of exercises performed 240, training goals 250, and environmental data 260. The comparison group size category of data 210, may include, for example, classifications including global 211, regional 212, national 213, group 214, and self 215, allowing data to be analyzed or corrected for comparison to varying groups of people for differing statistical analyses. The category of health profiles 220 may include, for example, data on user Body Mass Index (BMI) 221, fitness level 222, tobacco use 223, alcohol use 224, family history 225, and medical history 226, allowing for model construction to take into account health information on users. The data category of user age 230, may include age groupings, for example decadal age groupings, grouping together users who are less than 20 years old 231, 20-29 years old 232, 30-39 years old 233, 40-49 years old 234, 50-59 years old 235, 60-69 years old 236, and 70 or more years old 237, allowing prediction and model-building of health profiles and warnings where age is taken into account (for instance, users of a predictive health monitoring system who are 30-39 years old might be calculated to be at less risk of hip displacement during squats than users who are 60-69 years old, all other factors being equal). The data category relating to the type of exercise 240 a user or users perform may include any type of exercise, for example, running 241, swimming 242, cycling 243, rowing 244, or other types of exercise, allowing, for instance, a user's health predictions to take into account their age and the statistics of their region for individuals of similar age, but also refine the analysis to individuals and risks undertaken when a user participates in specified exercises. In this way, a user's health predictions will be different for differing exercises from another user, all other factors being equal. The data category of training goals 250 may include, for example, whether a user is training for strength 251, endurance 252, speed 253, or general fitness 254, which may be analyzed in the context of different intensities and practices of the exercise. For instance, an individual who is practicing weight-lifting for maximum strength gain may be assumed to be using heavier weights than an individual who is only training for endurance or general fitness, which may be taken into consideration for predicting user health risks and events ahead of time. The data category of environmental data 260 may include, for example, analyzing ambient and user temperature 261, humidity 262, altitude 263, terrain 264, and the rates of change of these datapoints, for instance the rate of change of the temperature as they are running outside 265. With these factors being analyzed together rather than only separately, health predictions may take on a much more holistic approach and be more accurately attuned to a specific user, for heightened accuracy. For instance, a user may be recorded as being 35 years old, be an occasional smoker, desire to train for a marathon with cycling, running, and swimming, and be monitored during a swim in a warm pool. In such an instance, if their region shows individuals in similar circumstances (similar age range, health background, and exercise form and goals) have a significantly increased risk of heart attack if they undergo the exercise at a high intensity, but not if the exercise is performed at a lower intensity or in a colder pool, the system may warn them to take these precautions ahead of time, aiding to mitigate the risks of such health events. This warning may be displayed on a connected phone or computer, or with a connected audio device, to warn or inform a user.

Figure 3:
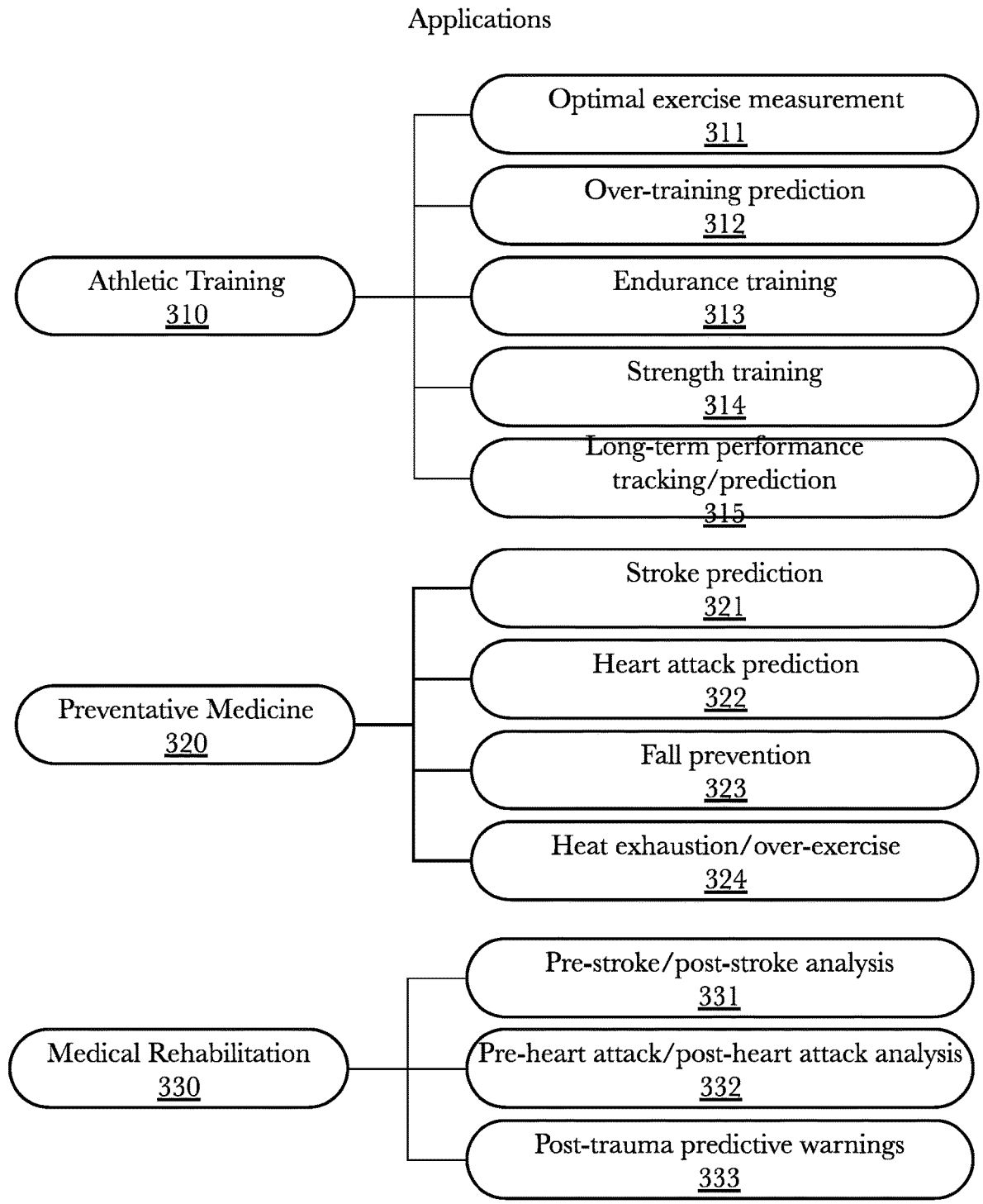
FIG. 3 is an exemplary diagram of diagram illustrating groups of related applications for the disclosed invention.

FIG. 3 is an exemplary diagram of diagram illustrating groups of related applications for the disclosed invention. One application is athletic training 310, for which the system is usable and optimized for analyzing and predicting optimal exercise measurement 311 such as predicting and detecting the movements of a user during exercise to determine if they are exercising optimally, this being accomplished with the plurality of sensors such as EMG, gyroscopes, and accelerometers on the device, over-training prediction 312 such that users who train too frequently on any given exercise may be warned due to higher risk of injury and lower fitness gains from over-training the body, endurance training 313 such as recommending to a user optimal exercises to increase endurance based on the totality of their data with the system, strength training 314 such as recommending optimal exercises for strength gain for a user, long-term performance tracking and prediction 315 which requires longer usage of the system but may be utilized to recommend more effective, or safer, or both, training programs and activities for a user. Another application is found in preventative medicine 320, including stroke prediction 321, heart attack prediction 322, fall prevention 323, and heat exhaustion or over-exercising warnings 324. These warnings are a result of the confluence of multiple factors including a user's age, nationality, fitness levels, exercise history, medical history, and more, and may be fine-tuned and made more accurate over time from both group statistical data and more refined data on a particular user. A third family of applications include medical rehabilitation 330, such as pre-stroke and post-stroke analysis 331, pre-heart attack and post-heart attack analysis 332, and post-trauma predictive warnings 333. Pre-stroke and post-stroke analysis 331 may take the form of monitoring a user's biometric feedback during exercise and physical activity both before and after a stroke event, and comparing them to determine patterns of behavior and user performance and health changes after a stroke event occurs. Similar methodology may be applied for analysis of a user before and after a heart attack 332, while post-trauma predictive warnings 333 may warn a user of likely health risks and possible injuries for specific exercises or other relevant data.

Figure 4:
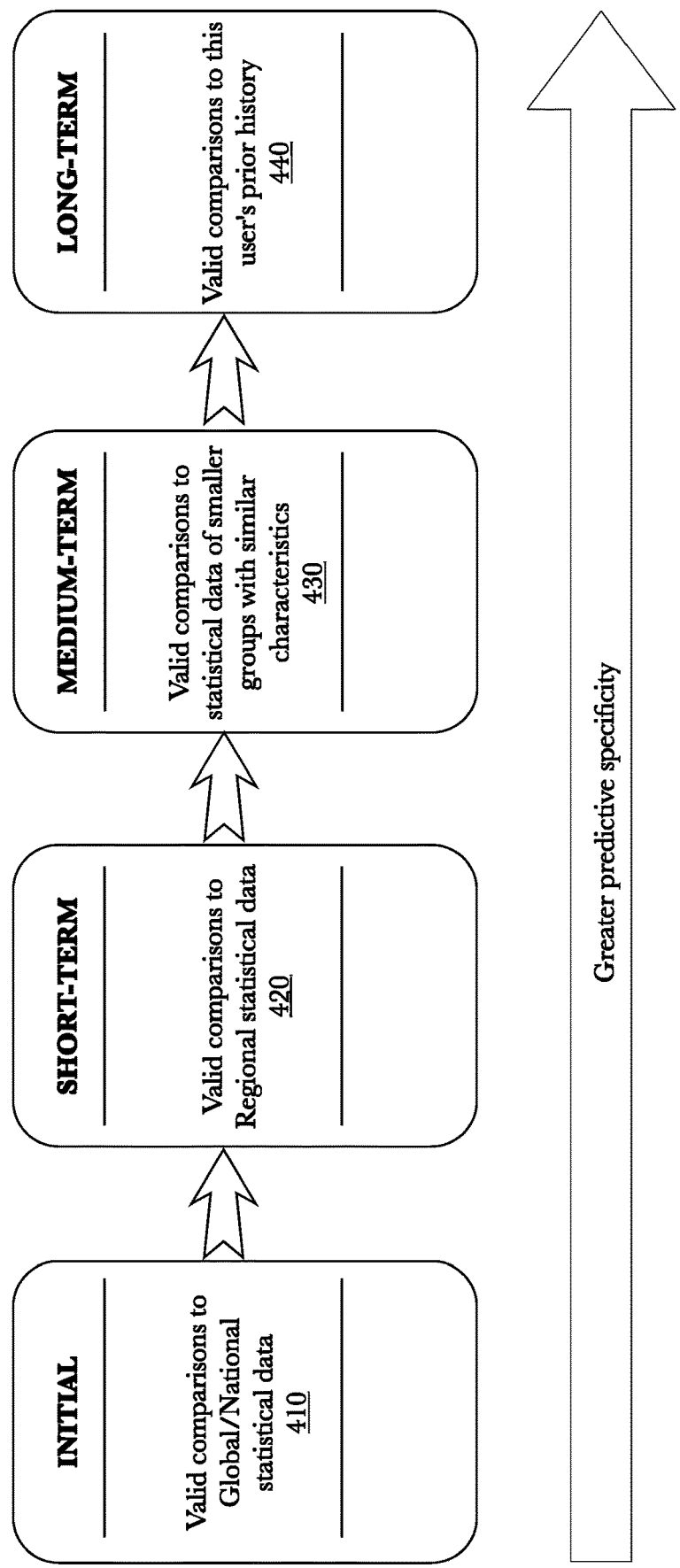
FIG. 4 is an exemplary diagram illustrating the progression of quality of predictions for a user over time, illustrating an initial predictive technique, a short-term improvement on predictive technique, and progression through medium-term and long-term data gathering to further improve predictive techniques for users.

FIG. 4 is an exemplary diagram illustrating the progression of quality of predictions for a user over time, illustrating an initial predictive technique, a short-term improvement on predictive technique, and progression through medium-term and long-term data gathering to further improve predictive techniques for users. There is a flow of data leading from an initial data availability and predictive quality using global or national statistical data 410, indicating the use of broadly available data such as national averages of hip displacement for individuals in a broad age range. This stage represents a lack of narrower regional data or personal data from a user, and represents the lowest accuracy and specificity with predictive health reporting. A second stage is short-term improvements of data availability and predictive quality, using more regional statistical data 420, for instance if a small area such as a single US state or even a single city has a different rate of risks for certain health and wellness events, for instance if people in a certain area experience more bone fractures or joint displacements for some reason, or higher incidences of heart attacks. A next stage involves medium-term improvements of data availability and predictive quality, using statistical data from smaller groups with similar characteristics to each other, for example groups of people who suffer strokes between the ages of 40-59 in California 430 and have moderate smoking habits, with a final stage of long-term improvements of data availability and predictive quality, using an individual user's prior history, including exercise and physiological records 440. As user data and global, national, regional, and local statistical and health data becomes more available, over time, the predictive quality of the system improves as shown.

Figure 5:
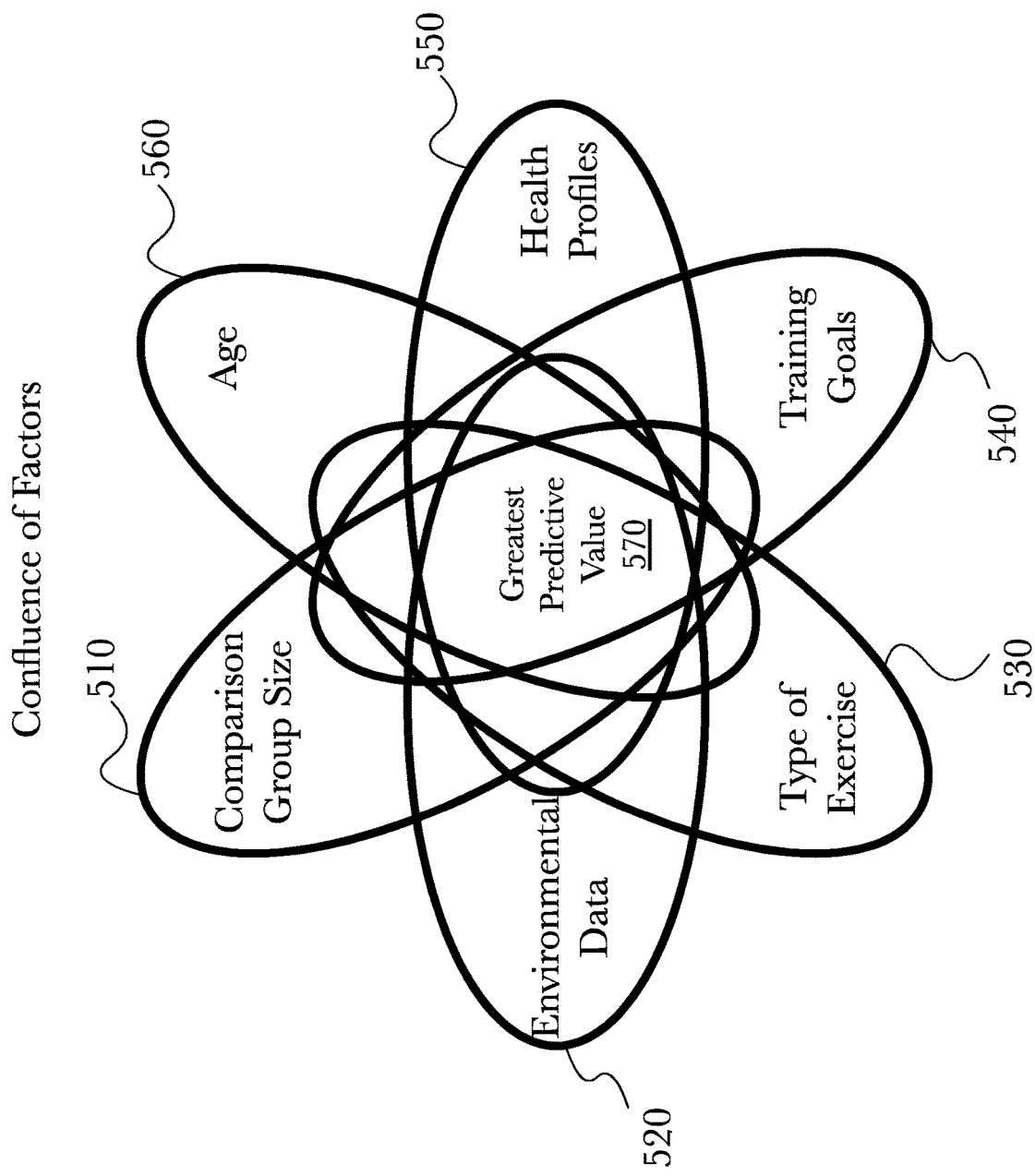
FIG. 5 is an exemplary diagram illustrating the overlap and confluence of various factors to achieve the greatest predictive value from overlapping data from all factors, including factors such as group size, user age, health data, and more.

FIG. 5 is an exemplary diagram illustrating the overlap and confluence of various factors to achieve the greatest predictive value from overlapping data from all factors, including factors such as group size, user age, health data, and more. Comparison group size 510, environmental data 520, type of exercise 530, training goals 540, health profiles 550, and age 560 data categories all are utilized to achieve a greatest predictive value 570, rather than analyzing a user on only one analysis vector such as the type of exercise 530.

Figure 6:
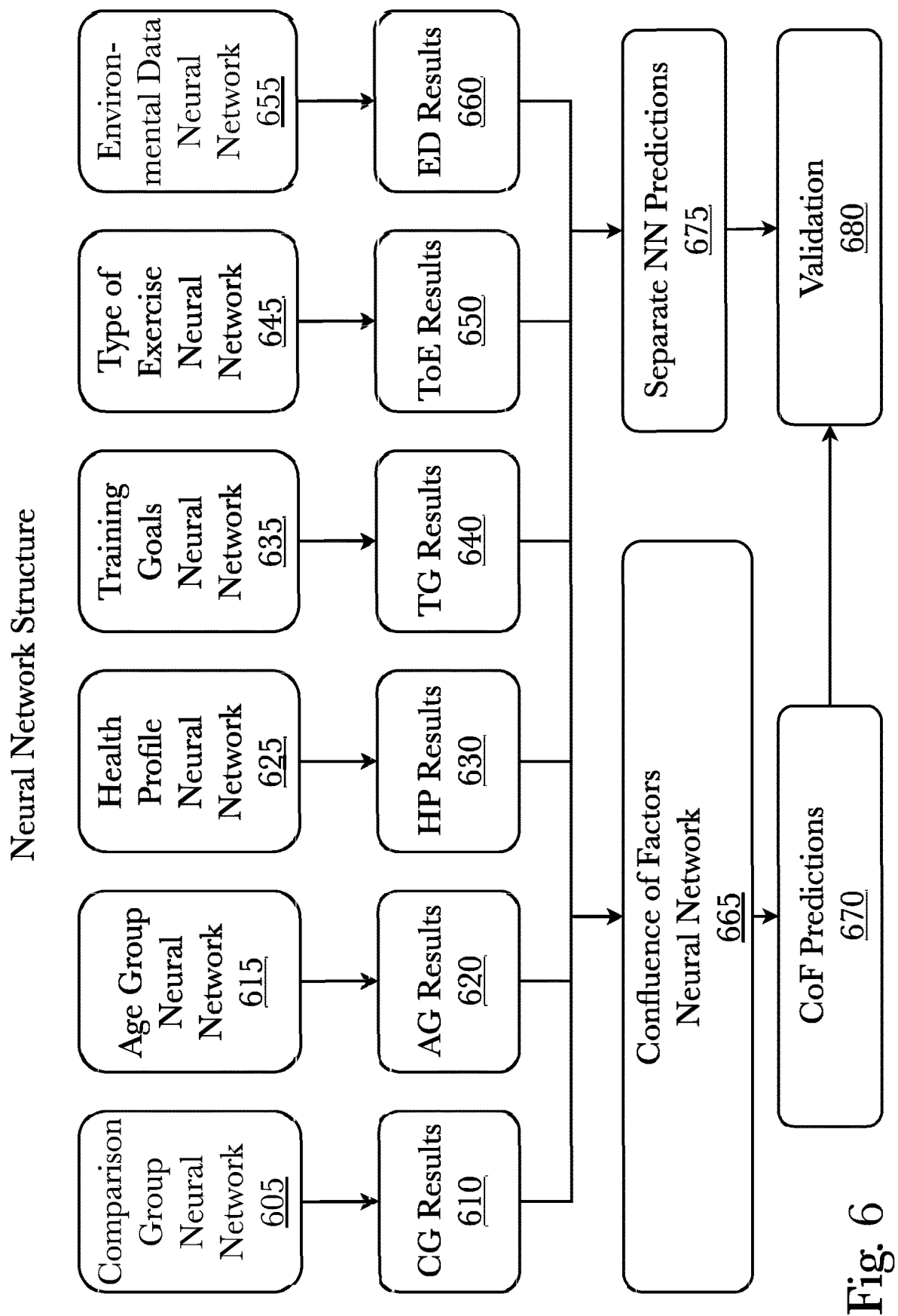
FIG. 6 is an exemplary diagram illustrating an exemplary structure of a system of neural networks operating on a confluence of factors related to a user's data as acquired by a system of sensors.

FIG. 6 is an exemplary diagram illustrating an exemplary structure of a system of neural networks operating on a confluence of factors related to a user's data as acquired by a system of sensors. Individual first-stage neural networks operate to analyze data based on a health-related factor such as comparison groups 605, age 615, health profile 625, training goals 635, exercise type 645, and environment 655. Each first-stage neural network evaluates the relevant data to find patterns of data in that category that lead to health events, utilizing descent gradient training and back propagation as shown in later drawings, and is configured to make a health prediction based on that health-related factor, for example a prediction based on the comparison group 610, a prediction based on age 620, a prediction based on the user's health profile 630, a prediction based on training goals 640, a prediction based on type of exercise 650, and a prediction based on the environment in which the user is exercising

660. These separate first-stage health predictions are then input into a second-stage neural network 665 (also called a confluence of factors neural network) that is configured to make a second health prediction 670 (also called a confluence of factors prediction) based on a combination of the first health predictions from at least two of the plurality of first-stage neural networks. The confluence of factors prediction 670 is then validated against 680 the aggregated results of the first-stage predictions 675 to ensure that the confluence neural network 665 is not overfitting to the data. In some embodiments, the validation 680 may comprise a combination or convolution of the separate neural network predictions 675 and the confluence factors prediction 670 to produce a third health prediction or to produce a confirming health prediction of either the separate neural network predictions 675 or the confluence factors prediction 670.

Figure 7:
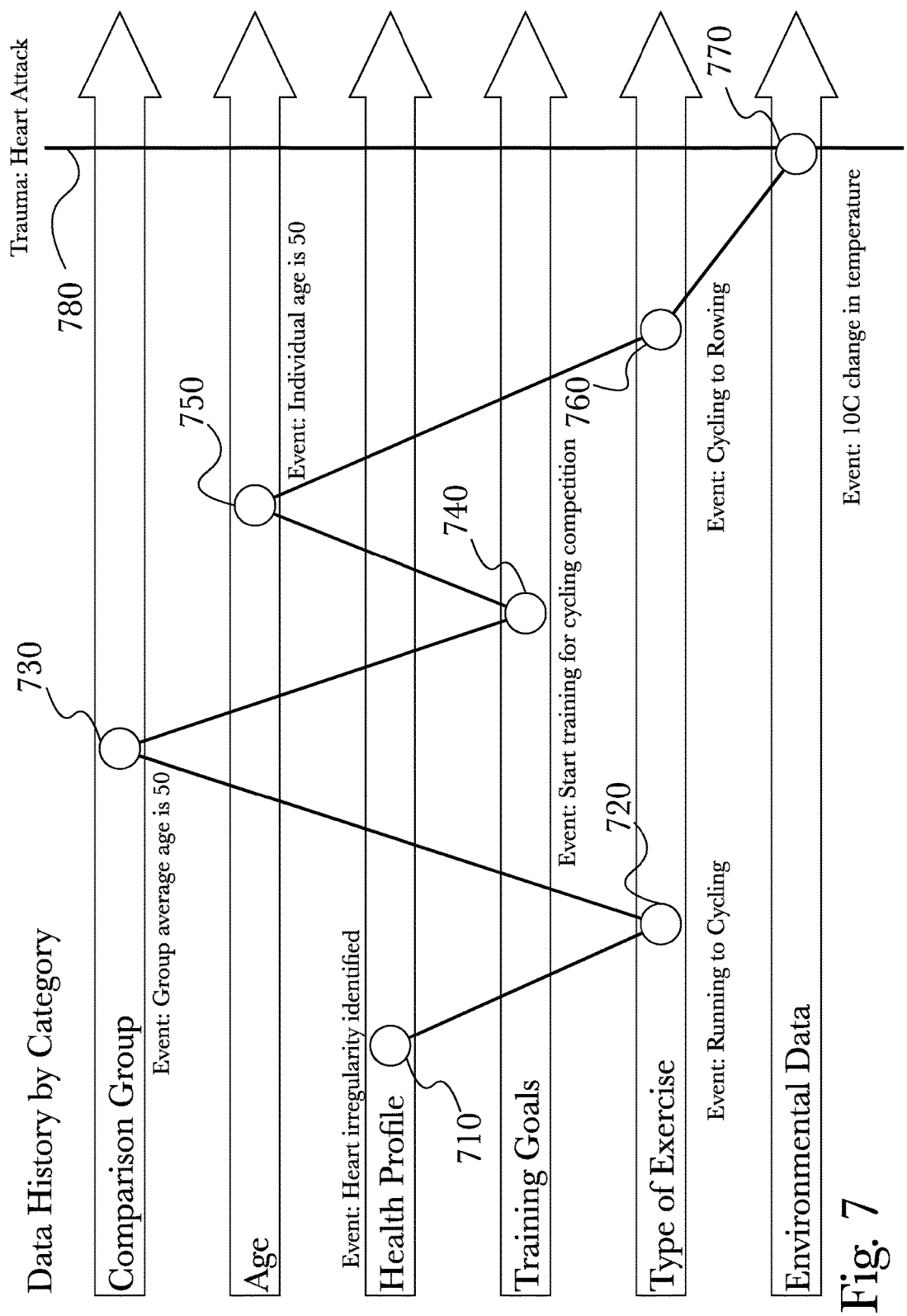
FIG. 7 is an exemplary diagram illustrating an exemplary series of events leading to a health event that may be predicted by training neural networks using back propagation.

FIG. 7 is an exemplary diagram illustrating an exemplary series of events leading to a health event that may be predicted by training neural networks using back propagation. In this example, a series of difficult-to-correlate events leads to a heart attack. Neural networks, trained on many, many similar events using back propagation, are able to connect and identify patterns of such events and build predictive models based on such training. Here, a traumatic health event occurs 780, in this case a heart attack, and the system examines the previous events leading up to the heart attack through back propagation. In this example it sees several events occur for a user before the heart attack, including a heart irregularity identification event 710 which can be an anomaly in the heartrate or pulse of a user, an exercise change event from running to cycling 720, a group age identification event 730 at which point the system identified the user as part of a new group of similar users due to current trends and user events, a training goal change event, indicating a goal to train for a cycling competition 740, an individual age identification event 750 which can occur due to an age change, or the user's age only now being input into the system, or may be the result of the system merely making note of the user's age in the back propagation even if the user's age did not change immediately prior to the heart attack, an exercise change event from cycling to rowing 760, and an environmental change event, in this example a 10 degree shift in temperature of the surrounding environment 770. Through examining similar series of events for large numbers of users and large amounts of data, the neural network is able to detect repeatable patterns in seemingly unrelated events which are predictive of health outcomes. Neural networks may be configured to detect such patterns within a single health-related factor. For example, a series of changes in a user's health profile that lead to a heart attack such as weight gain, followed by increased cholesterol levels, followed by high blood sugar levels. Neural networks may be used at a first stage to detect such patterns. More difficult to detect are patterns of health events across health factors. A neural network may be configured to analyze a confluence of factors to detect seemingly unrelated events that show a repeatable pattern of prediction of certain health outcomes. The example in this diagram shows, for example, a heart irregularity 710 followed by a couple of age-related thresholds 730 and 750, combined with two type of exercise changes 720 and 760, a training goal change 740, and a temperature change during exercise 770. It is unlikely that these events would have been correlated with the heart attack by standard health prediction models, but neural networks excel at identifying such patterns and correlations over large sets of data.

Figure 8:
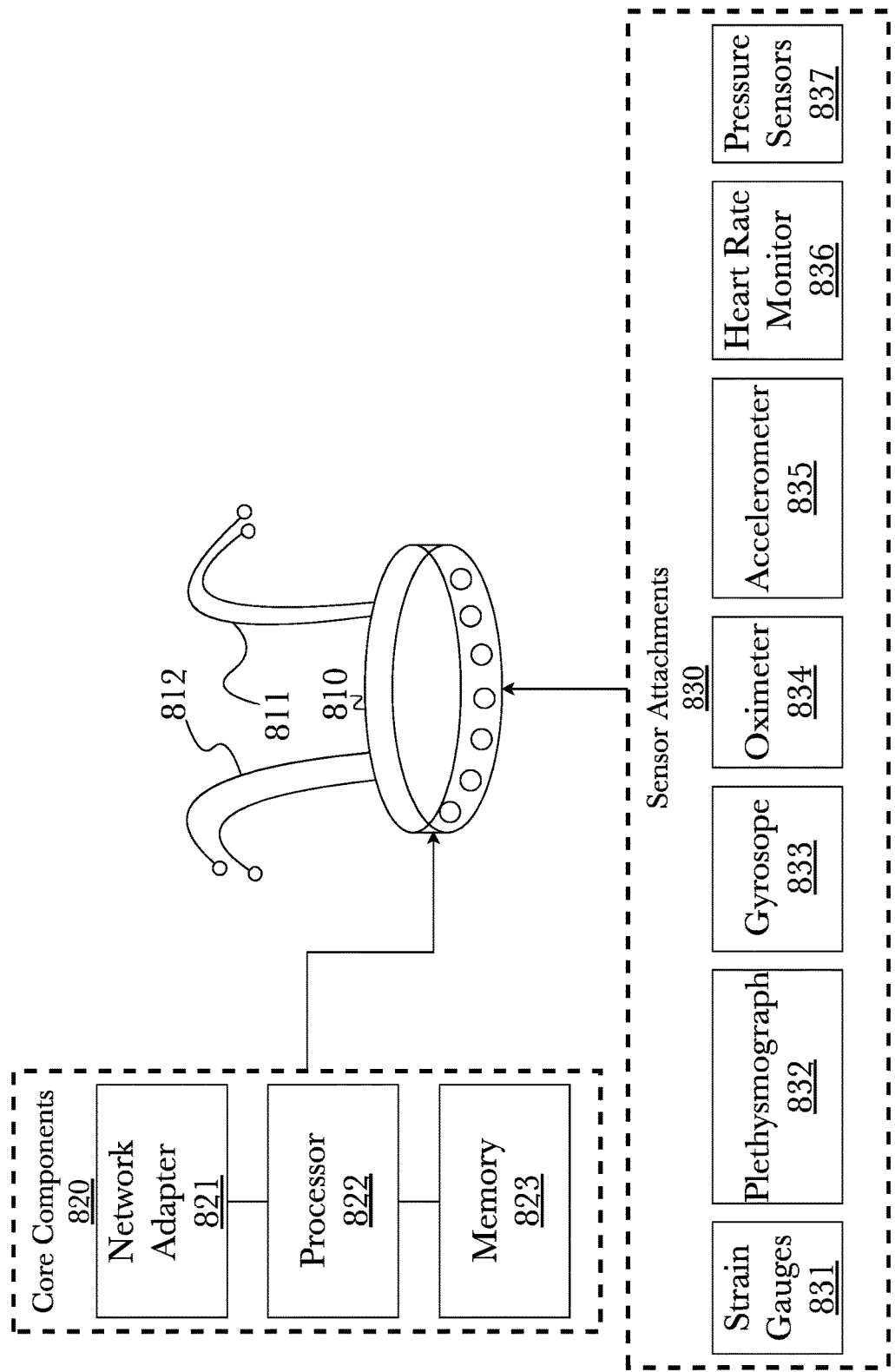
FIG. 8 is an exemplary diagram of sensors being connected to a wearable device, for the gathering of data on a user during physical activities.

FIG. 8 is an exemplary diagram of sensors being connected to a wearable device, for the gathering of data on a user during physical activities. A wearable device 810 as shown may be in the form of a weight belt, a wrist strap, an arm band, a chest strap, or may be formed into a vest or other wearable configuration. The wearable device 810 comprises core computing device components 820 and one or more sensors 830, which may be built-in or may be in the form of removable or exchangeable attachments. Other external sensors may be attached via wires, cables, or wireless devices, for example EEG sensors could be connected via one set of connections 811 and EMG sensors could be connected via a second set of connections 812. These core components may comprise a network adapter 821, a processor 822, and a digital memory storage 823, such that the sensor data may be processed and the harness may connect to an auxiliary device such as a smartphone to give the user the relevant health warnings as needed. One or more additional sensor attachments on the exercise and health prediction belt 830 exist, including a strain gauge or gauges 831, a plethysmograph 832, a gyroscope 833, an oximeter 834, an accelerometer 835, a heart rate monitor 836, and a pressure sensor or plurality of pressure sensors 837. These sensors are relatively common sensing and health monitoring devices, and with the EEG 811 and EMG 812 sensors, allow the wearable device to detect the plurality of biometric and positioning data about a user required for neural networks to learn to predict health-related events during exercise.

Figure 9:
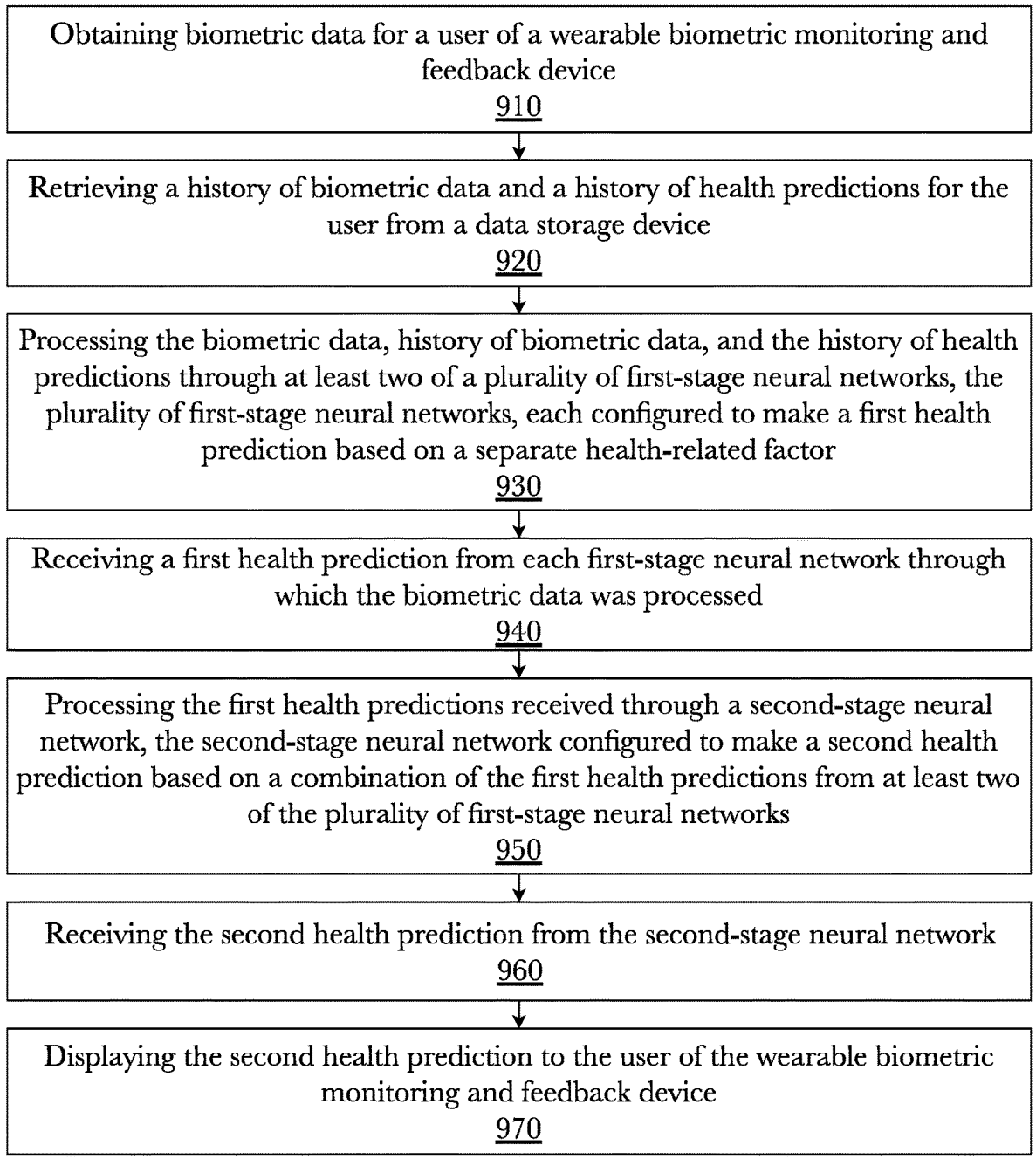
FIG. 9 is an exemplary method for predictive health monitoring using neural networks.

FIG. 9 is an exemplary method for predictive health monitoring using neural networks. First, a predictive health monitoring harness obtains biometric data for a user of a wearable biometric monitoring and feedback device 910, before retrieving a history of biometric data and a history of health predictions for the user from a data storage device 920, such a data storage device either being a memory in the harness or being stored on a peripheral device such as a smartphone that may be connected to the harness. Processing the biometric data, history of biometric data, and the history of health predictions through at least two of a plurality of first-stage neural networks is then performed, the plurality of first-stage neural networks, each configured to make a first health prediction based on a separate health-related factor 930, before receiving a first health prediction from each first-stage neural network through which the biometric data was processed 940. The system then processes the first health predictions received through a second-stage neural network, the second-stage neural network configured to make a second health prediction based on a combination of the first health predictions from at least two of the plurality of first-stage neural networks 950, receiving the second health prediction from the second-stage neural network 960 and then displaying the second health prediction to the user of the wearable biometric monitoring and feedback device 970, through either a connected display, smartphone, or other device that can connect over a network to the monitoring harness.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit ("ASIC"), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 10:
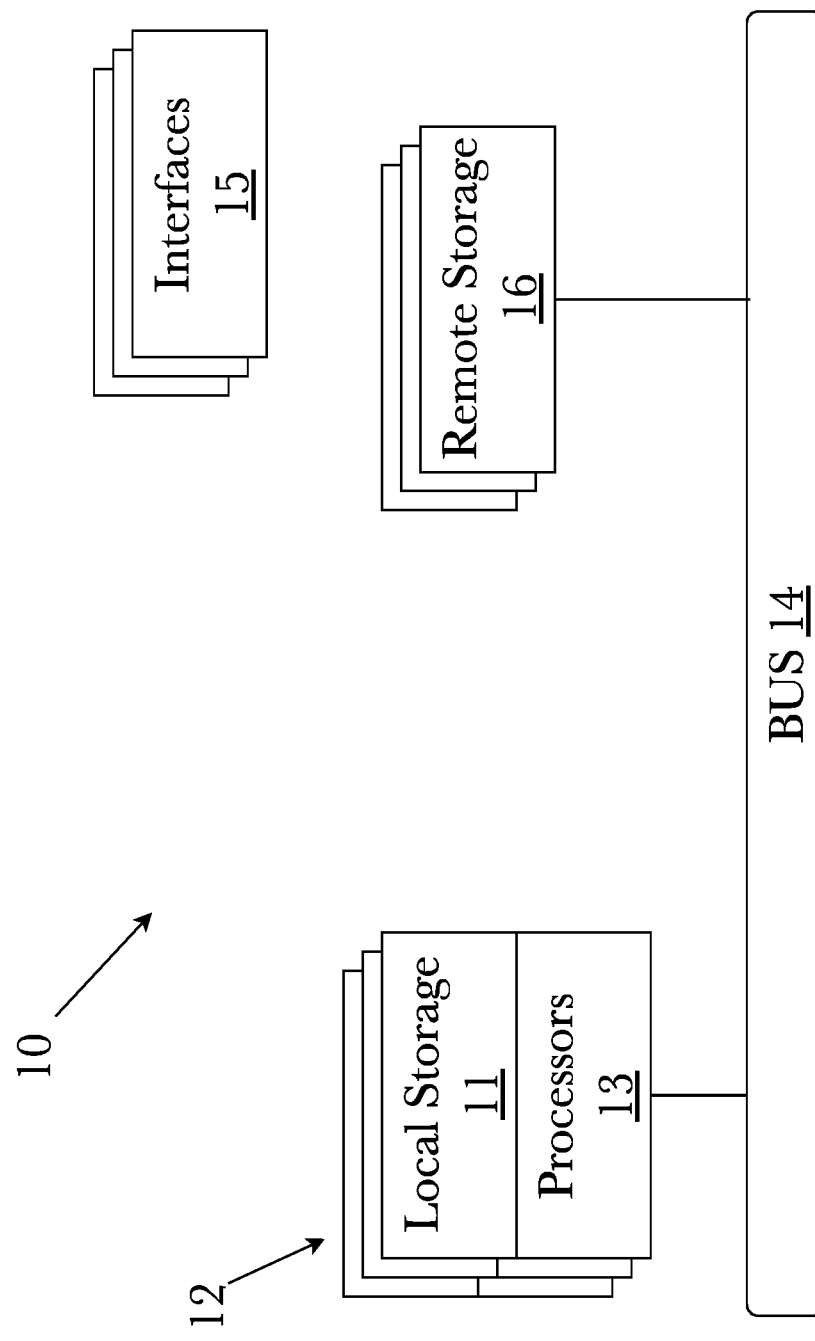
FIG. 10 is a block diagram illustrating an exemplary hardware architecture of a computing device.

Referring now to FIG. 10, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity AN hardware interfaces) and, in some instances, volatile and/or non-volatile memory (e.g., RAM).

Although the system shown in FIG. 10 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 11:
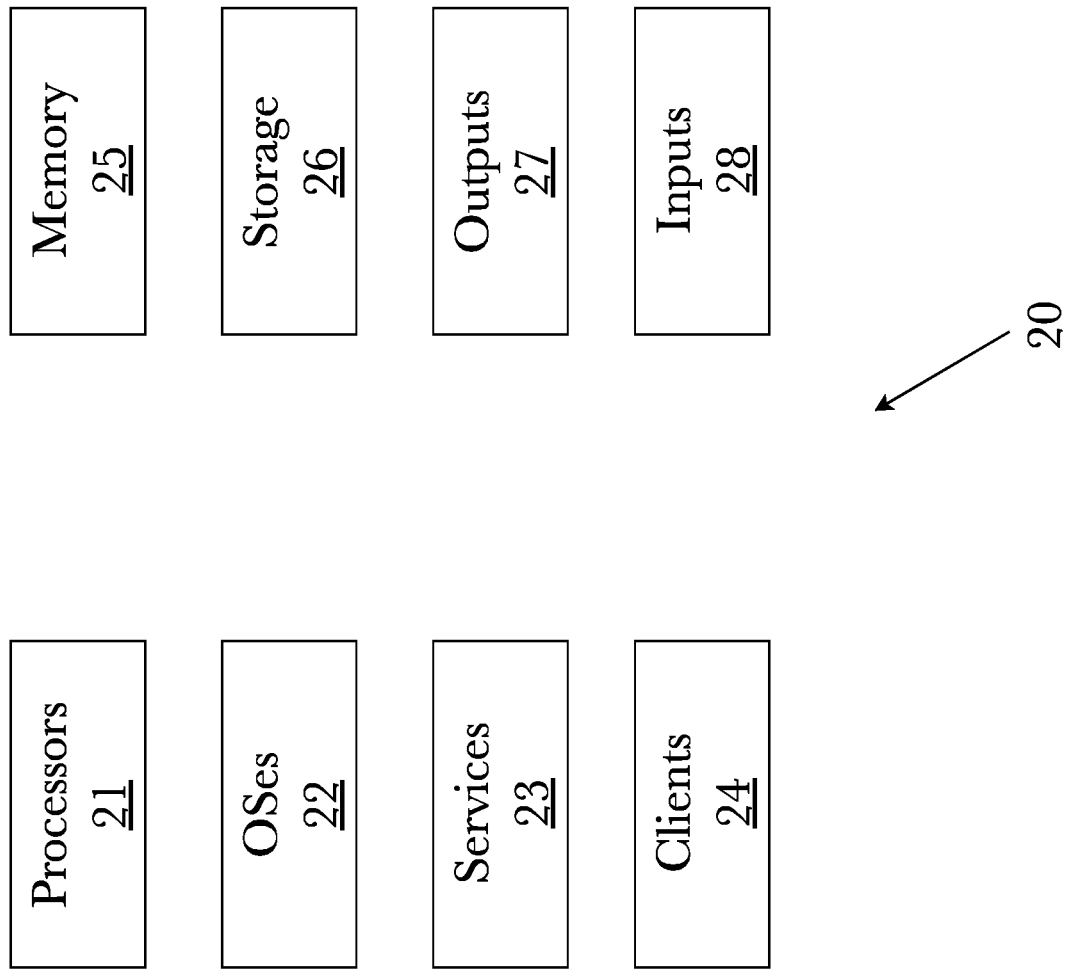
FIG. 11 is a block diagram illustrating an exemplary logical architecture for a client device.

In some aspects, systems may be implemented on a standalone computing system. Referring now to FIG. 11, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21.

Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 10). Examples of storage devices 26 include flash memory, magnetic hard drive, CD-ROM, and/or the like.

Figure 12:
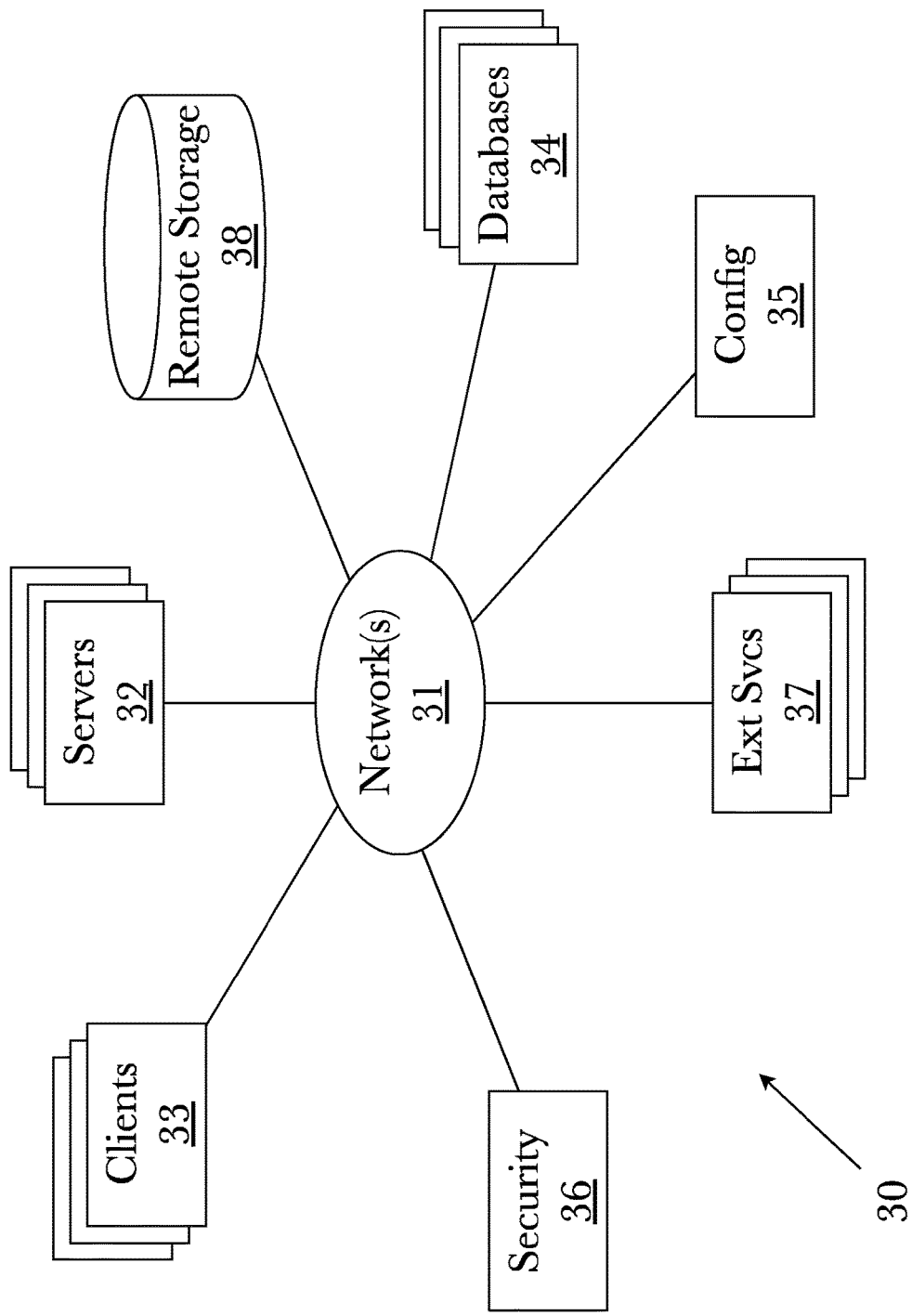
FIG. 12 is a block diagram showing an exemplary architectural arrangement of clients, servers, and external services.

In some aspects, systems may be implemented on a distributed computing network, such as one having any number of clients and/or servers. Referring now to FIG. 12, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 11. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 13:
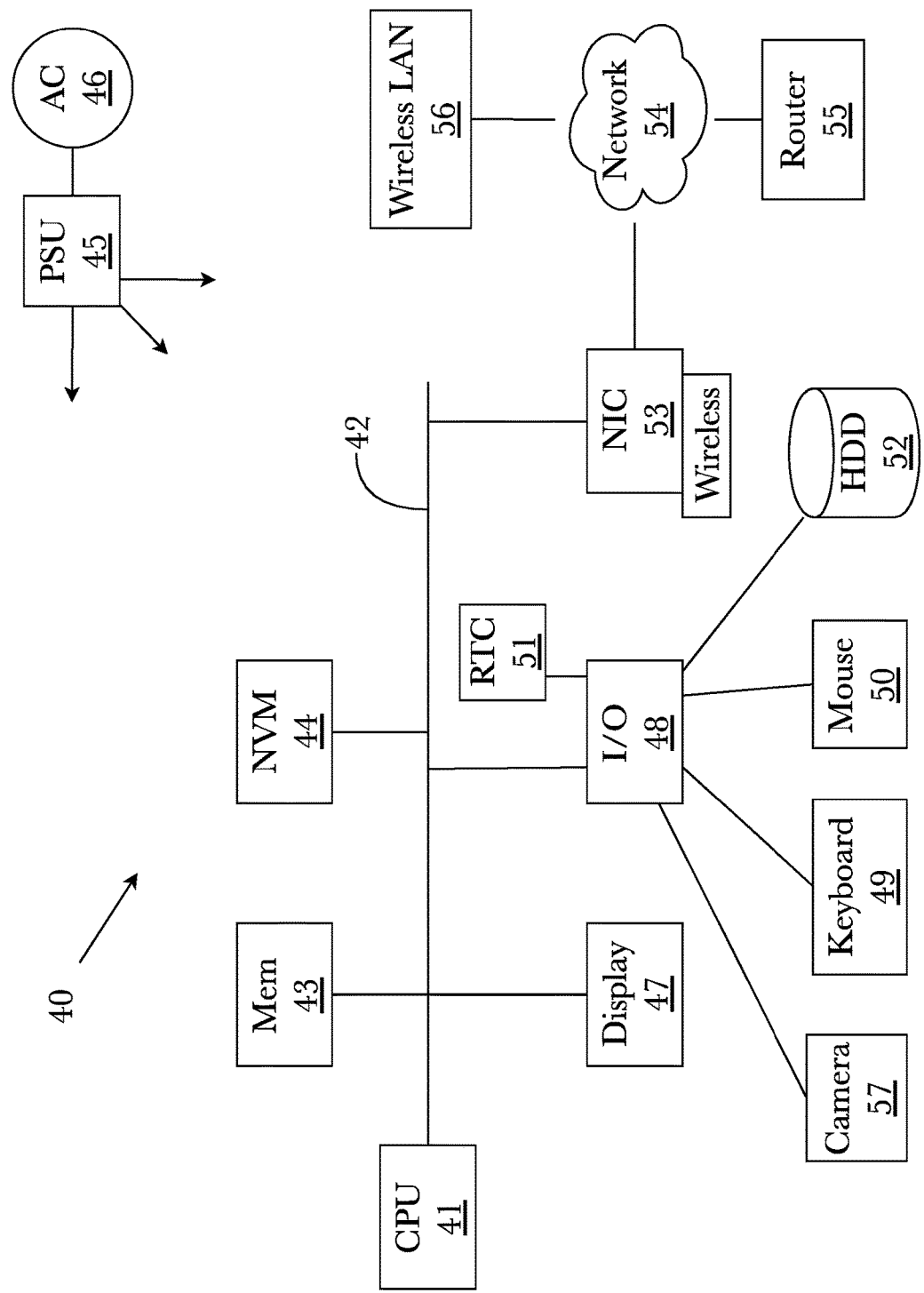
FIG. 13 is another block diagram illustrating an exemplary hardware architecture of a computing device.

FIG. 13 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

The skilled person will be aware of a range of possible modifications of the various embodiments described above. Accordingly, the present invention is defined by the claims and their equivalents.

What is claimed is:
1. A system for predictive health monitoring, comprising:
a cloud-based health prediction engine comprising:
    a plurality of first-stage neural networks, each configured to make a first health prediction based on a health-related factor;
    a second-stage neural network, configured to make a second health prediction based on a combination of the first health predictions from at least two of the plurality of first-stage neural networks, wherein the second health prediction was not contained in any of the first health predictions;
a data storage device configured to store a history of biometric data and a history of health predictions for a user of a wearable biometric monitoring and feedback device;
a network-connected server comprising a memory, a processor, and a plurality of programming instructions, wherein the programming instructions, when operating on the processor, cause the network-connected server to:
    receive biometric data from the wearable biometric monitoring and feedback device for the user;
    retrieve the history of biometric data and the history of health predictions for the user from the data storage device;
    process the biometric data, history of biometric data, and the history of health predictions through at least two of the plurality of first-stage neural networks;
    receive the first health prediction from each first-stage neural network through which the biometric data was processed;
    process the first health predictions received through the second-stage neural network;
    receive the second health prediction from the second-stage neural network;
    send the second health prediction to the wearable biometric monitoring and feedback device, and
the wearable biometric monitoring and feedback device comprising:
    a plurality of sensors for gathering biometric data from the user of the wearable biometric monitoring and feedback device;
    a network device configured to connect to the cloud-based health prediction system;
    a screen for providing feedback to the user; and
    a computing device comprising a memory, a processor, and a plurality of programming instructions, wherein the programming instructions, when operating on the processor, cause the computing device to:
        obtain biometric data from at least two of the plurality of sensors for the user of the wearable biometric monitoring and feedback device;
        send the biometric data obtained to the cloud-based health prediction engine using the network device;
        receive the second health prediction from the cloud-based health prediction engine; and
        display the second health prediction to the user.

2. The system of claim 1, wherein the user can enter an age, a health profile, a type of exercise, or a training goal, and wherein the data processed by the neural networks further comprises the user's age, the health profile, the type of exercise, or the training goal.

3. The system of claim 2, wherein the data processed by the neural networks further comprises statistical data for a group of users similar in at least one aspect to the user of the wearable biometric monitoring and feedback device.

4. The system of claim 3, wherein the statistical data comprises data representative of a global or national group.

5. The system of claim 3, wherein the statistical data comprises data representative of a local or regional group.

6. The system of claim 1, wherein the wearable biometric monitoring and feedback device further comprises sensors that collect non-biometric data, and wherein the data processed by the neural networks further comprises the non-biometric data.

7. The system of claim 1, wherein the wearable biometric monitoring and feedback device uses the network device to obtain weather data from the Internet, and wherein the data processed by the neural networks further comprises the weather data.

8. A method for predictive health monitoring, comprising the steps of:
   obtaining biometric data for a user of a wearable biometric monitoring and feedback device;
   retrieving a history of biometric data and a history of health predictions for the user from a data storage device;
   processing the biometric data, history of biometric data, and the history of health predictions through at least two of a plurality of first-stage neural networks, the plurality of first-stage neural networks, each configured to make a first health prediction based on a separate health-related factor;
   receiving a first health prediction from each first-stage neural network through which the biometric data was processed;
   processing the first health predictions received through a second-stage neural network, the second-stage neural network configured to make a second health prediction based on a combination of the first health predictions from at least two of the plurality of first-stage neural networks, wherein the second health prediction was not contained in any of the first health predictions;
   receiving the second health prediction from the second-stage neural network; and
   displaying the second health prediction to the user of the wearable biometric monitoring and feedback device.

9. The method of claim 8, wherein the user can enter an age, a health profile, a type of exercise, or a training goal, and wherein the data processed by the neural networks further comprises the user's age, the health profile, the type of exercise, or the training goal.

10. The method of claim 9, wherein the data processed by the neural networks further comprises statistical data for a group of users similar in at least one aspect to the user of the wearable biometric monitoring and feedback device.

11. The method of claim 10, wherein the statistical data comprises data representative of a global or national group.

12. The method of claim 10, wherein the statistical data comprises data representative of a local or regional group.

13. The method of claim 8, wherein the wearable biometric monitoring and feedback device further comprises sensors that collect non-biometric data, and wherein the data processed by the neural networks further comprises the non-biometric data.

14. The method of claim 8, wherein the wearable biometric monitoring and feedback device further comprises a network device that obtains weather data from the Internet, and wherein the data processed by the neural networks further comprises the weather data.

* * * * *